United States Patent
Got et al.

(10) Patent No.: US 6,650,967 B1
(45) Date of Patent: Nov. 18, 2003

(54) BATTERY CONFIGURATION WITH A CLICK

(75) Inventors: Pierre Got, Montreal (CA); Christian de Varennes, Montreal (CA); Marc Lavergne, Laval (CA)

(73) Assignee: Astec International Limited, Kowloon (HK)

(*) Notice: Subject to any disclaimer, the term of this patent is extended or adjusted under 35 U.S.C. 154(b) by 626 days.

(21) Appl. No.: 09/586,294

(22) Filed: Jun. 2, 2000

(51) Int. Cl.[7] .............................................. G05D 11/00
(52) U.S. Cl. ........................ 700/286; 702/63; 320/123; 324/434; 307/64
(58) Field of Search ................................ 700/286, 297, 700/9, 2, 3, 22; 324/434, 426; 307/66, 65, 64; 320/123; 340/636.1; 702/63

(56) References Cited

U.S. PATENT DOCUMENTS

| | | | | |
|---|---|---|---|---|
| 5,332,927 A | * | 7/1994 | Paul et al. ..................... 307/66 |
| 5,422,558 A | * | 6/1995 | Stewart ....................... 320/120 |
| 5,642,100 A | * | 6/1997 | Farmer .................... 340/636.13 |
| 5,705,929 A | * | 1/1998 | Caravello et al. ............ 324/430 |
| 5,917,250 A | * | 6/1999 | Kakalec et al. ............... 307/18 |
| 5,930,779 A | * | 7/1999 | Knoblock et al. ........... 705/412 |
| 6,278,200 B1 | * | 8/2001 | Daniel et al. ................. 307/31 |
| 6,281,602 B1 | * | 8/2001 | Got et al. ...................... 307/66 |
| 6,437,574 B1 | * | 8/2002 | Robinson et al. ........... 324/426 |
| 6,473,762 B1 | * | 10/2002 | Knoblock et al. .......... 707/100 |
| 6,498,491 B2 | * | 12/2002 | Plow et al. ................. 324/426 |
| 6,498,966 B1 | * | 12/2002 | Akerlund .................... 700/296 |
| 6,532,425 B1 | * | 3/2003 | Boost et al. .................. 702/63 |

* cited by examiner

Primary Examiner—Ramesh Patel
Assistant Examiner—Edward F. Gain
(74) Attorney, Agent, or Firm—Harness, Dickey & Pierce, P.L.C.

(57) ABSTRACT

An automated battery configuration system for a telecommunications power system includes at least one rectifier module, a controller and at least one backup battery. A database system is associated with the controller stores a plurality of records that include a plurality of backup battery parameters. A user interface that is associated with the controller receives user-provided input of at least one battery specifying parameter. The user interface communicates with the database system to retrieve a selected one of the records based on the battery specifying parameter. The controller communicates with the database system and employs at least one of the parameters of the selected record to alter an operating setting of the telecommunications power system. The battery specifying parameters include a manufacturer designation and a model designation of the backup battery.

18 Claims, 5 Drawing Sheets

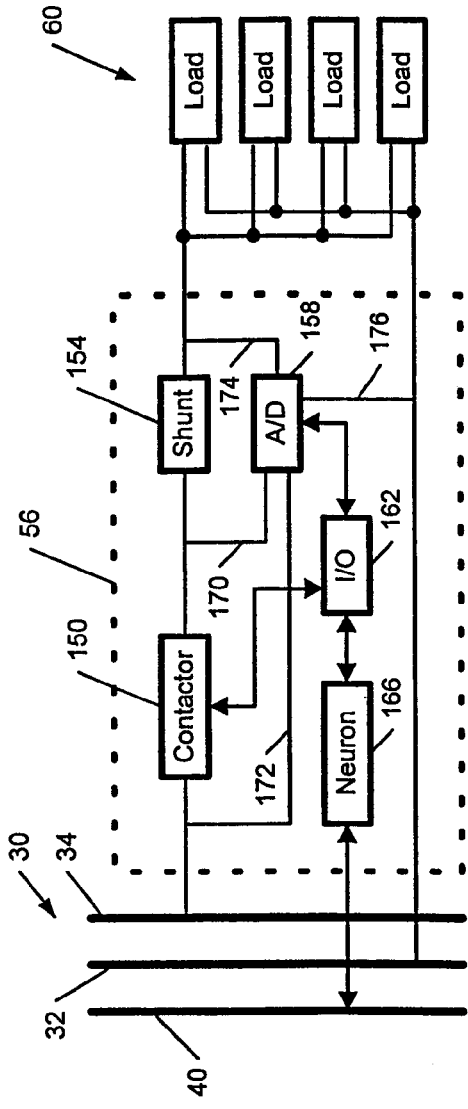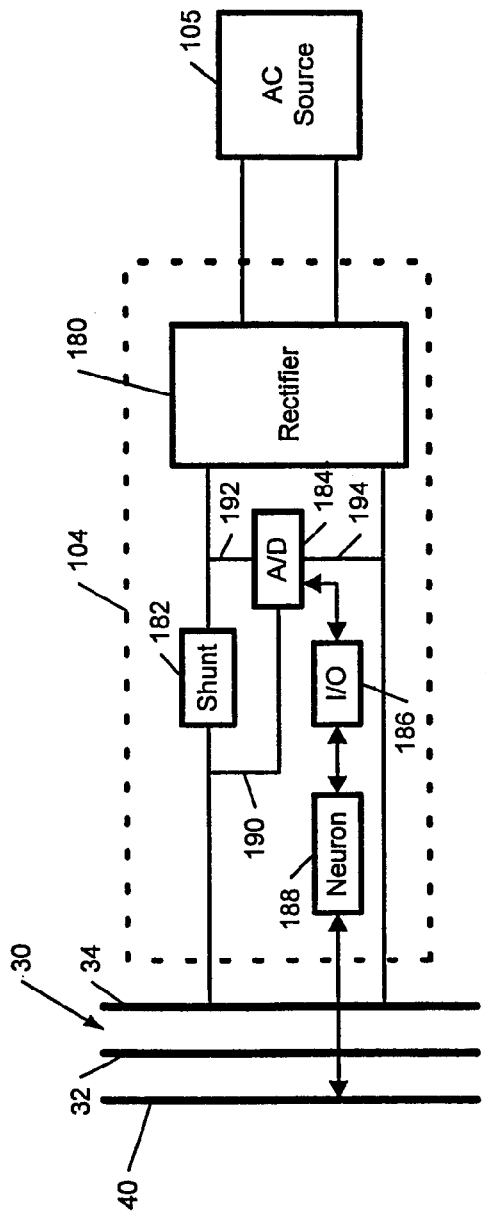

BATTERY CONFIGURATION WITH A CLICK

TECHNICAL FIELD OF THE INVENTION

The present invention relates generally to telecommunications power systems. More particularly, the invention relates to a graphical user interface-enhanced system and method for configuring the telecommunications power system to work with different user-selected backup batteries.

BACKGROUND AND SUMMARY OF THE INVENTION

Most consumers are unaware that the telephone companies provide a 48-volt direct current (DC) supply voltage via telephone lines for voice communications signals. The telephone lines carry the DC voltage to support the voice communications signals even when the customer loses alternating current (AC) power. The DC voltage is provided by the telecommunications power systems that are generally situated at central office switching locations and other substations. The telecommunications power systems also power the switches and associated telecommunications equipment upon which the telephone infrastructure operates. The telecommunications power systems typically include banks of rechargeable batteries to ensure that the DC supply voltage can be maintained during AC power outages.

In addition to the switches, other telecommunications systems also require an uninterruptable supply of DC power. These systems include Internet switching and routing nodes, cellular telephone equipment, and other telecommunications system equipment. Although the voltage and current requirements may vary, all of these telecommunications systems need reliable DC power supplies with backup battery systems.

A bank of storage batteries for a moderate-sized telecommunications power system typically includes one or more large pallets of backup batteries that include one or more strings of 24 to 26 battery cells. When longer backup periods are desired, the number and/or size of battery strings is increased. Backup batteries for a typical installation represent a sizeable investment. Often, the backup batteries cost as much as or more than the remaining components in the telecommunications power system. Understandably, engineers focus on maximizing backup battery life while minimizing the operating costs.

Replacing backup batteries in the telecommunications power system can be an intimidating proposition. The telecommunications power systems are designed to deliver high current. Heavy-duty cables, typically several inches in diameter, are used to deliver the current. To optimize backup battery life, the telecommunications power systems generally need to be initially configured, reconfigured when new batteries are added, and/or reconfigured when the backup batteries are replaced. For example, the float voltages, maximum-operating voltages, charge current and other parameters vary from one type of battery to another due to differences in the construction of the backup batteries.

There are many manufacturers and models of backup batteries that can be used for telecommunications power systems. Configuring the telecommunications power systems to operate with a particular type of backup battery through conventional techniques requires the consideration of many parameters. Highly trained engineers are needed to determine appropriate float voltages, alarms and other settings for a particular backup battery. The required use of highly skilled engineers increases the owning and operating costs of the telecommunications power system.

The present invention provides a far more convenient and user friendly system for setting battery parameters in the telecommunications power systems. The invention provides a simple graphical user interface for selecting parameters such as a battery manufacturer and a battery model. The invention employs a user interface manager that receives the user input and interfaces with a database manager to access a database. The database manager uses the manufacturer and model designations to access a pre-stored table of parameters for a selected backup battery. The parameters, along with other user-supplied information, are used to generate the proper settings for a specific installation.

The software architecture of the preferred embodiment allows setup using a display screen and touch pad assembly located on the master controller or through a remote site using a web browser. Additionally the database can be updated from the remote site. Thus, a technician or engineer can reconfigure the telecommunications power system from a remote site. This allows additional flexibility in coordinating the schedules of maintenance personnel with an attendant reduction in the overall cost to operate the system. Additionally, the technician can remotely modify, delete or add records for backup batteries to keep the database up to date.

For a more complete understanding of the invention, its objects and its advantages, refer to the following specification and to the accompanying drawings.

BRIEF DESCRIPTION OF THE DRAWINGS

The various advantages of the present invention will become apparent to those skilled in the art after reading the following specification and by reference to the drawings in which:

FIG. 3 is a functional block diagram of the distribution module of FIG. 1 in further detail;

FIG. 4 is a functional block diagram of the rectifier module of FIG. 1 in further detail;

DETAILED DESCRIPTION OF THE PREFERRED EMBODIMENTS

The preferred embodiments herein described are not intended to be exhaustive or to limit the invention to the precise form disclosed. This description is limited to the preferred embodiment only and is intended to describe the invention to enable one of ordinary skill in the art to practice the invention.

Figure 1:
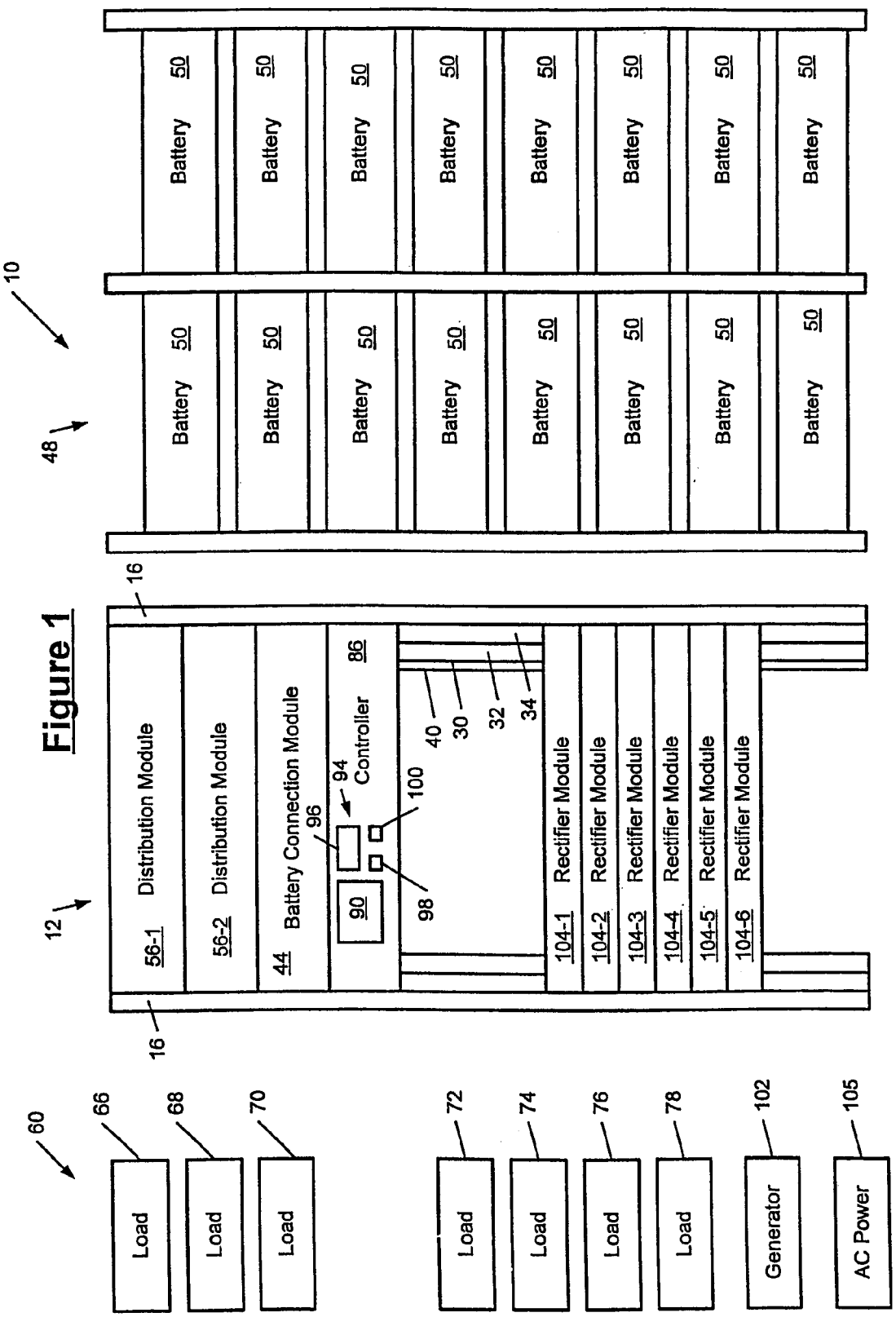
FIG. 1 is a block diagram of a telecommunications power system according to the invention that includes a frame that is connected to a plurality of loads and a battery pallet with a plurality of batteries.

Referring now to FIG. 1, a telecommunications power system 10 is illustrated and includes one or more frames 12 that include a rack 16. A direct current (DC) bus 30 includes first and second conductors 32 and 34 that extend along the rack 16 in a vertical direction and that are separated by an insulating layer (not shown). A communications bus 40 is located adjacent the DC bus 30 and likewise includes a layer (not shown) that insulates the communications bus 40 from the first and second conductors 32 and 34.

The design of the telecommunications power system 10 is modular such that the capacity of the system 10 can be changed by adding or removing modules from the system 10. The design of the telecommunications power system 10 has been optimized through the use of modular connectors (not shown) to facilitate the connection and disconnection of the modules from the frame 12.

The telecommunications power system 10 includes one or more battery connection modules 44 that are connected to the DC bus 30 and the communications bus 40. The battery connection module 44 is connected to a pallet of backup batteries 48 that includes a plurality of battery cells 50. In a preferred embodiment, each of the battery cells provides a two-volt output and a relatively high current output. The battery cells 50 are typically connected into battery strings (identified at 106 in FIG. 2) that contain from 24 to 26 battery cells. Each battery string provides 48 VDC for telephone switch and router applications. The number and/or capacity of the backup batteries may be varied depending upon the length of time desired for the battery backup and the size of load to be supplied. Skilled artisans can appreciate that other voltages, string sizes and packaging arrangements can be employed for telecommunications power systems having other power requirements.

One or more distribution modules 56 are connected to the DC bus 30 and the communications bus 40. The distribution modules 56 distribute power to one or more loads 60 such as telecommunications switches, cellular equipment and routers. For example in FIG. 1, the distribution module 56-1 delivers power to loads 66, 68 and 70. The distribution module 56-2 delivers power to loads 72, 74, 76, and 78. The number of distribution modules depends on the size and number of the loads that are associated with the telecommunications power system 10.

A master controller 86 is connected to the DC power bus 30 and to the communications bus 40. The master controller 86 includes a display 90 and an input device 94 that preferably includes a touch pad 96 and buttons 98 and 100. An alternate display can be a computer monitor. The input device 94 and the display 90 can be combined in a touch screen display. A keyboard and/or a mouse may also be employed. The master controller 86 preferably provides an internet browser-like interface that is navigated using the touch pad 96 in a conventional point-and-click manner or using the touch pad 96 and the buttons 98 and 100. Alternately, text-based and/or menu-driven interfaces can be provided.

The telecommunications power system 10 further includes one or more rectifier modules 104 that are connected to the DC bus 30 and the communications bus 40. A generator 102 supplies the rectifier modules 104 when AC power from an AC source 105 is lost.

Figure 2:
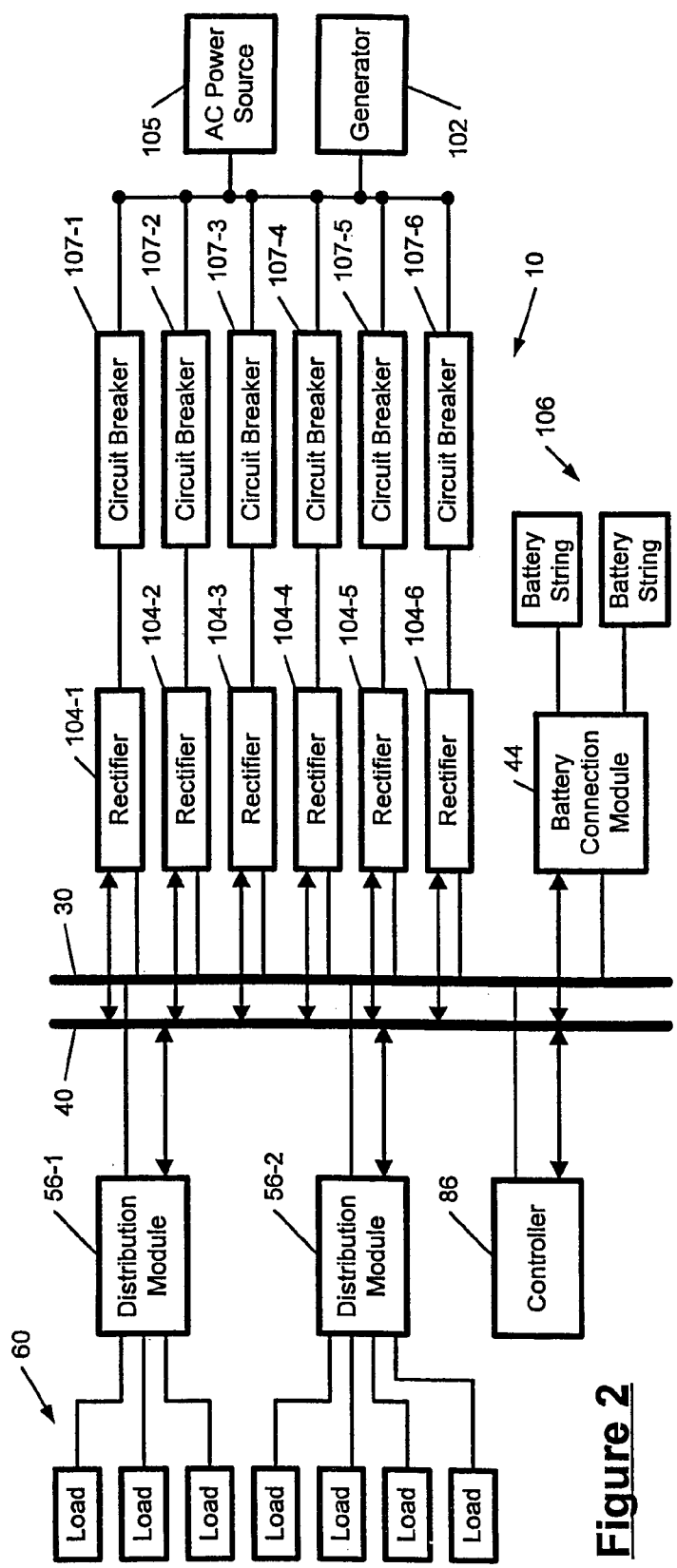
FIG. 2 is a functional block diagram of the telecommunications power system of FIG. 1.

Referring now to FIG. 2, the backup batteries are typically connected in battery strings 106 containing 24 to 26 battery cells. The AC power source 105 is connected to the rectifier modules 104 using circuit breakers 107. The generator 102 provides backup AC power using a transfer switch (not shown) in a conventional manner when AC power is lost. Connections between the loads, the generator, and the backup batteries have been omitted in FIG. 1 for purposes of clarity.

In use, the AC power source 105 provides voltage that is typically between 80 and 300 VAC at a frequency between 45 and 65 Hz. The rectifier modules 104 rectify the AC voltage provided by the AC sources 105. The rectifier modules 104 provide a controllable output voltage and current and are rated at 48 volts nominal and 50 or 200 amps. Skilled artisans can appreciate that other rectifier voltage and current outputs can be provided depending upon the requirements of the telecommunications power system 10.

Depending upon the type of backup batteries employed, the output voltage of the rectifier modules 104 will be set higher than 48 volts. Typically, the rectifier modules 104 operate at a float voltage of the backup batteries during normal operation so that the backup batteries do not discharge current. The float voltage is typically set between 52 and 54 VDC depending upon the characteristics of the backup batteries.

The rectifier modules 104 preferably include a shunt, sensing leads, and an analog to digital (A/D) converter for sensing rectifier voltage and current. The rectifier module 104 transmits digital signals representing the rectifier voltage and current (in addition to other digital control and communications signals) to the controller 86 via the communications bus 40. Likewise, the battery control modules 44 and the distribution modules 56 include a shunt, sensing leads, and an analog-to-digital converter for sensing battery and load voltages and currents. Preferably, the controller 86 employs a serial communications protocol that is insensitive to noise. In a preferred embodiment, the communications system employs serial communications using a CAN protocol such as CAN version 2.0B.

The distribution modules 56 include one or more circuit breakers (not shown) which are preferably modular plug-in type circuit breakers to facilitate connection and disconnection of the loads 60. The distribution module 56 connects the loads 60 to the DC power bus 30.

Referring now to FIG. 3, the distribution module 56 is illustrated in further detail. The distribution module 56 includes one or more circuit breakers (not shown) that are located between the loads 60 and the DC bus 30. The distribution module 56 includes a contactor 150, a shunt 154, an A/D converter 158, an I/O interface 162, and a neuron 166. The contactor 150 is controlled by the neuron 166 through the I/O interface 162. The contactor 150 connects and disconnects the loads 60 and is provided if the telecommunications system operator desires load disconnection. Otherwise, the contactor 150 can be omitted to prevent the single point of failure. If the contactor 150 fails, power to the loads is interrupted and service will be lost. If battery disconnection is substituted (as in FIG. 5) and a contactor fails, the loads still receive power.

The neuron 166 is preferably a controller that includes a processor and memory (not shown). The neuron 166 performs local processing for the distribution module 56 and I/O communications between the distribution module 56, the master controller 86, and other modules in the telecommunications power system 10. The I/O module 162 is connected to the neuron 156 and to the A/D converter 158. The A/D converter 158 includes sensing leads 170 and 172 that sense a voltage across the contactor 150. The sensing lead 170 and sensing lead 174 sense a voltage across the shunt 154 so that a load current can be calculated. The sensing leads 174 and 176 sense a voltage output across the loads 60.

Referring now to FIG. 4, the rectifier modules 104 are illustrated in further detail and include a rectifier 180, a shunt 182, an A/D converter 184, an I/O interface 186, and a neuron 188. The neuron 188 performs local processing functions for the rectifier module 104 and controls I/O communications between the rectifier module 104, the master controller 86 and other modules in the telecommunications power system 10. The A/D converter 184 includes sensing leads 190, 192, and 194. The A/D converter 184 senses a rectifier voltage using the sensing leads 192 and 194 and a rectifier current by sensing a voltage across the shunt 182 using leads 190 and 192.

Figure 5:
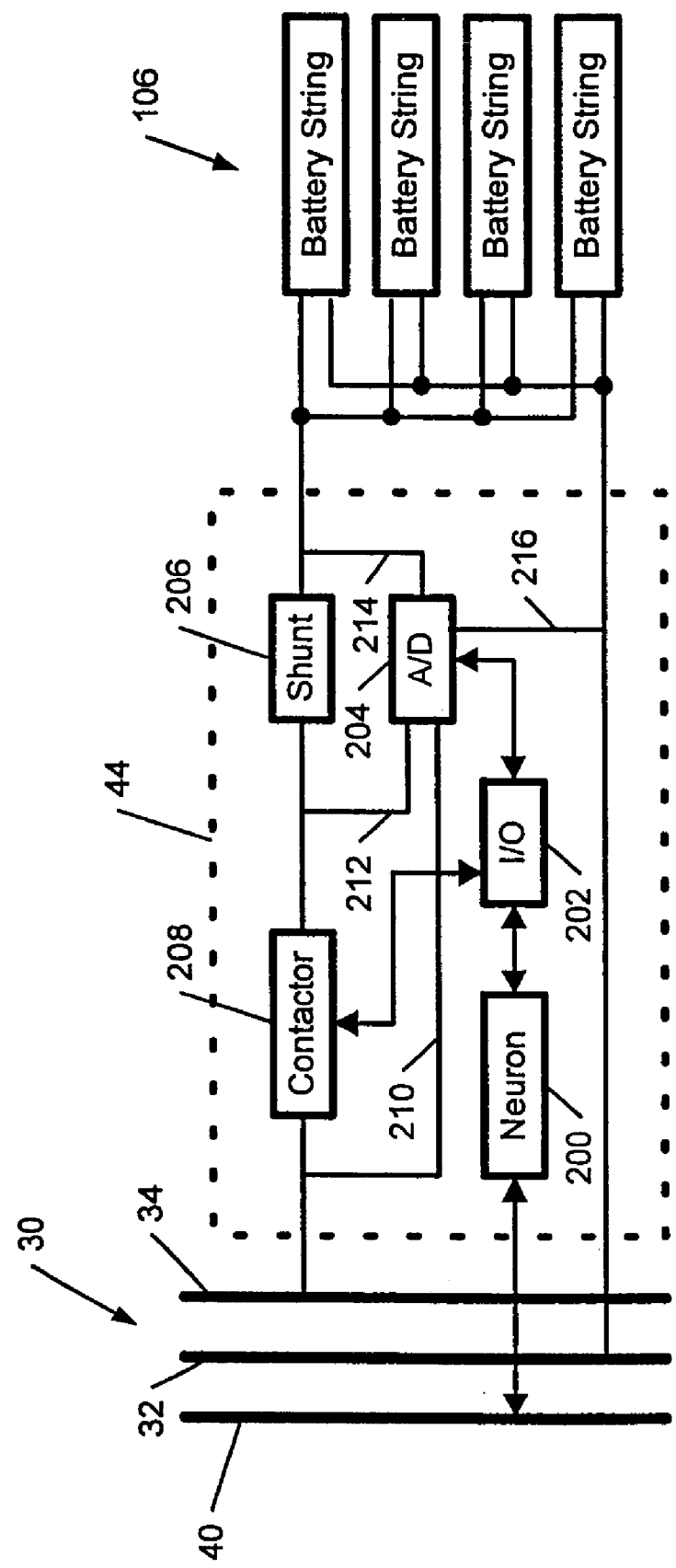
FIG. 5 is a functional block diagram of the battery connection module of FIG. 1 in further detail.

Referring now to FIG. 5, the battery connection module 44 is illustrated and includes a neuron 200, an I/O interface 202, an A/D converter 204, a shunt 206 and a contactor 208. The neuron 200 performs local processing functions and I/O communications between the battery connection module 44, the master controller 86 and other modules in the telecommunications power system 10. The contactor 208 is controlled by the neuron 200 through the I/O interface 202. The A/D converter 204 includes sensing leads 210, 212, 214, and 216. The A/D converter 204 senses a battery voltage using the leads 214 and 216. The A/D converter 204 senses a battery current by sensing a voltage drop across the shunt 206 using the leads 212 and 214. The A/D converter 204 senses a voltage across the contactor 208 using the leads 210 and 212.

Figure 6:
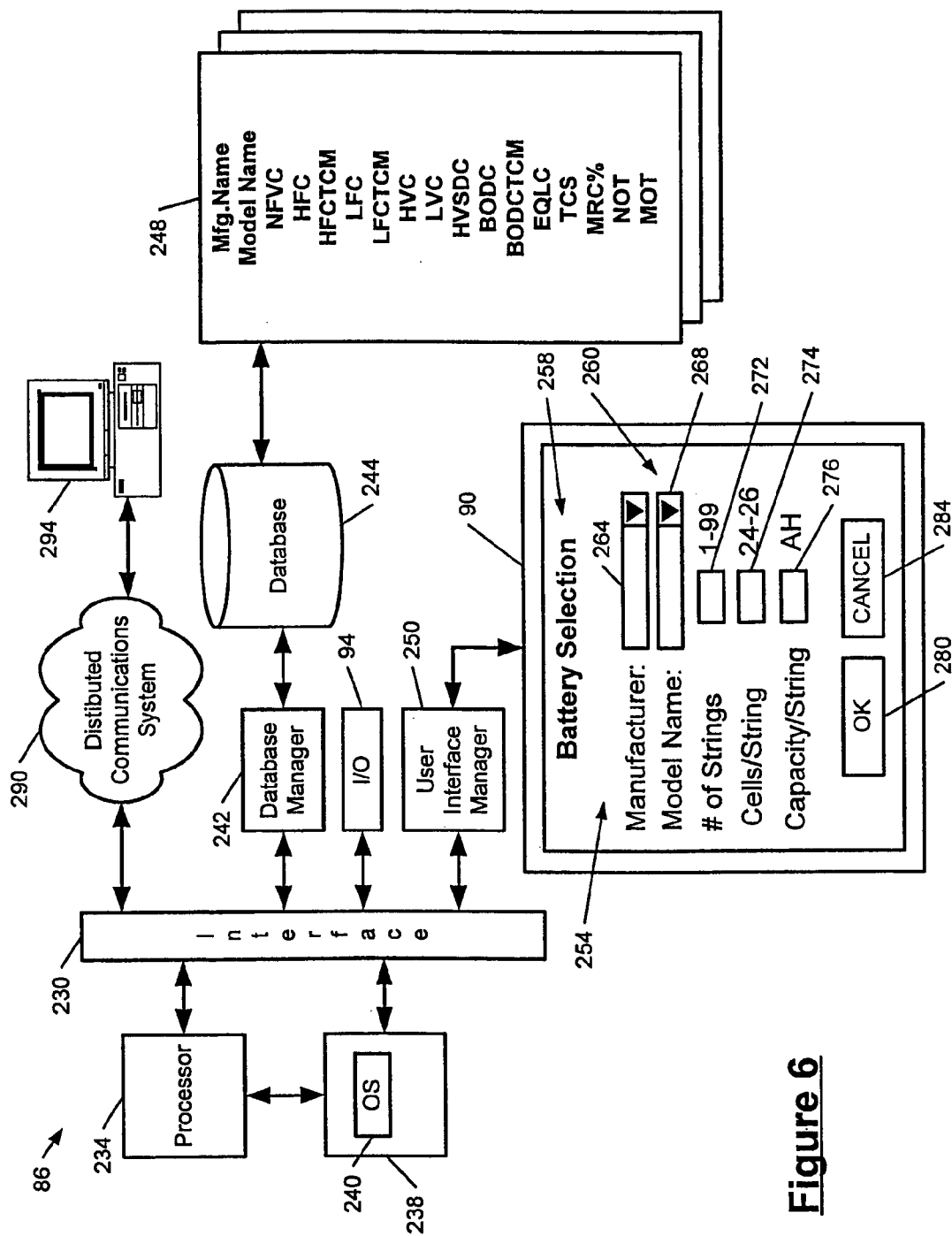
FIG. 6 is a functional block diagram illustrating a battery configuration system according to the invention.

Referring now to FIG. 6, the master controller 86 is illustrated in further detail. The master controller includes an I/O interface 230 that is connected to a processor 234 and memory 238. The memory 238 includes random access memory (RAM), read only memory (ROM) and/or a storage device such as a hard drive, a floppy drive, an optical drive, or other suitable electronic memory storage. In use, the memory 238 loads an operating system module 240. A database manager 242 communicates with a database 244 that contains one or more relational tables 248. One of the relational tables 248 contains a plurality of rows of backup battery parameter records. Each record contains a plurality of backup battery parameters that relate to a single type of backup battery. Each of the backup battery parameter records is uniquely identifiable using a primary key. One or more data fields may be used to create the primary key.

A user interface manager 250 provides a graphical user interface (GUI) 254 for user interaction. Alternately, a menu-driven or text-based menu can be substituted for the GUI 254. In addition to other screens, the GUI 254 includes a battery selection screen 258. A backup battery selection interface 260 identifies the type of backup batteries used in the telecommunications power system 10 along with other battery configuration information. In a preferred embodiment, the backup battery selection interface 260 allows the user to select and/or input a first backup battery parameter that is used to identify the type and/or characteristics of the backup batteries used in the telecommunications power system 10. A product brand name, a serial number or a Universal Product Code (UPC) may be sufficient to uniquely identify the type of backup batteries to be used. Alternately, one or more additional parameters may be needed (in combination with the first parameter) to uniquely identify the type of backup battery used.

In a preferred embodiment, the backup battery parameter is a manufacturer designation. A drop-down list box 264 for selecting the manufacturer of the backup batteries is used. Since manufacturer typically make more than one type of battery, a second parameter is preferably a model designation of the backup battery. A drop-down list box 268 allows the user to select a model designation for the manufacturer. Drop-down list boxes 264 and 268 facilitate data entry and data integrity by requiring the user to select from a list that is provided by the database 244. Entry of invalid manufacturers due to typographical errors is avoided. When the user selects the manufacturer using the drop-down list box 264, the model designations provided in the drop-down list box 268 are preferably limited to those associated with the manufacturer. The manufacturer and model designations are used in combination to create the primary key for accessing the relational table 248. The primary key is used to lookup additional parameters for the backup batteries that have been identified.

The user enters the number of backup battery strings 106 in the telecommunications power system 10 using a text box 272. Data validation using acceptable ranges can be employed to verify the users input. For example, the number of strings in a telecommunications power system 10 is typically limited between a first number and a second number (such as 1 and 99). The user enters the number of cells per string in text box 274. Range checking is likewise employed to limit the number of cells per string between a third number and a fourth number (such as 24 and 26). A capacity per string, typically specified in Amps-Hours (AH), is also input using a text box 276. Command buttons 280 and 284 allow the user to approve or cancel the changes.

In addition to the manufacturer and model designations, the battery database 244 preferably contains parameters relating to a cell float voltage. One or more of the following parameters may be included: a recommended cell float voltage at a nominal temperature (NFVC); a maximum cell float voltage at the nominal temperature (HFC); a maximum cell float voltage with temperature compensation (TCM) at the nominal temperature (HFCTCM); a minimum cell float voltage at the nominal temperature (LFC); and a minimum cell float voltage with TCM at the nominal temperature (LFCTCM).

The battery database 244 preferably contains one or more parameters relating to voltage alarm thresholds. One or more of the following parameters may be included: a high voltage alarm threshold per cell (HVC); a low voltage alarm threshold per cell (LVC); a high voltage shut down alarm threshold per cell (HVSDC); a battery on discharge alarm threshold per cell (BODC); and a battery on discharge alarm threshold with TCM per cell (BODCTCM).

Other likely parameters include an equalized voltage per cell (EQLC); a temperature compensation slope (TCS); a maximum recharge current in percentage of the AH rating (MRC %); a nominal operating temperature (NOT); and/or a maximum operating temperature (MOT).

By designating the manufacturer and the model, the correct parameters can be assigned to appropriate system operating settings. Data entry errors are significantly reduced over manual entry methods. In a preferred embodiment, all of the parameters listed above are stored in the records of the relational table 248. Skilled artisans can appreciate that one or more of the parameters listed above can be omitted from the records of the relational table 248 without departing from the spirit of the invention. Likewise, parameters in addition to those listed above can be included in the relational table 248.

In use, the master controller 86 and/or the neurons 166, 188, and 200 use the parameters to operate the telecommunications power system 10. A user employs the display 90 and the I/O device 94 of the master controller 86 to access the user interface manager 250 that provides the battery parameter interface 260. Using the buttons 98 and 100 and/or the touch pad 96, the user selects the manufacturer designation from the drop-down list box 264 and the model designation using the drop-down list box 268. Text boxes, text-based selection menus and other types of entry may be used. The user enters the number of strings in the telecommunications power system 10 using the text box 272. The user enters the number of cells per string in the text box 274. The capacity per string is also input using the text box 276. The command buttons 280 and 284 allow the user to approve or cancel the selections.

When the user approves the selections, the user interface manager 250 communicates with the database manager 242 and the database 244. The database manager 242 and the database 244 identify a selected record using the manufacturer and model designations to access the relational table 248. The related parameters are returned to the database manager 242 for use by the master controller 86. The master controller 86 assigns the parameters to system operating settings that may be stored in another table in the database 244 and/or in the memory 238. The master controller 86 operates the telecommunications power system 10 based on the stored system operating settings.

The database manager 242, the database 244 and the relational table 248 can be accessed remotely using a distributed communications system 290 such as the Internet using a remote computer 294. The remote computer 294 may also be used to access the backup battery selection interface 260 using a web browser. The remote computer 294 sends commands that update the relational table by adding records for new types of backup batteries, modifies one or more records to reflect changes in the parameters, adds or deletes data fields in the relational table 248 and/or deletes records for obsolete types of backup batteries. By providing access via the distributed communications system 290, the remote computer 294 can keep the relational tables 248 of one or more telecommunications power systems 10 up to date.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An automated battery configuration system for a telecommunications power system of the type including at least one rectifier module and at least one backup battery, comprising:
   a controller;
   a database system associated with said controller for storing a plurality of records that include a plurality of backup battery parameters; and
   a user interface associated with said controller for receiving user-provided input of at least one battery specifying parameter,
   wherein said user interface communicates with said database system to retrieve a selected one of said records based on said battery specifying parameter, and
   wherein said controller communicates with said database system and employs at least one of said parameters of said selected record to modify an operating setting of said telecommunications power system.

2. The automated battery configuration system of claim 1 wherein said user interface includes a graphical user interface.

3. The automated battery configuration system of claim 1 wherein said user interface includes a text-based, menu-driven interface.

4. The automated battery configuration system of claim 1 wherein said user interface is accessed using a display and an input device that is associated with said controller.

5. The automated battery configuration system of claim 1 wherein said user interface is accessed using a remote computer through a distributed communications system.

6. The automated battery configuration system of claim 1 wherein said battery specifying parameter includes a manufacturer designation of said backup battery.

7. The automated battery configuration system of claim 1 wherein said battery specifying parameter includes a model designation of said backup battery.

8. The automated battery configuration system of claim 1 wherein said parameters include at least one of a high voltage alarm, a low voltage alarm, a float voltage of said backup battery, a temperature-based parameter, and a backup battery discharge alarm.

9. The automated battery configuration system of claim 1 further comprising:
   a distributed communications system;
   a remote computer that is connected to said distributed communications system, wherein said remote computer modifies at least one of said plurality of records.

10. The automated battery configuration system of claim 1 wherein said user interface receives user-provided input of at least one of the following: a number of backup battery strings, a number of cells per string, and a capacity per string.

11. A method for automatically configuring a backup battery system for a telecommunications power system of the type including at least one rectifier subsystem and at least one backup battery, comprising the steps of:
   storing a plurality of records in a database, wherein each record includes a plurality of backup battery parameters;
   receiving user-provided input of at least one battery specifying parameter;
   communicating with said database to retrieve a selected one of said records based on said battery specifying parameter; and
   employing at least one of said parameters of said selected record to modify an operating setting for said telecommunications power system.

12. The method of claim 11 further comprising the step of: providing a graphical user interface for receiving said user-provided input.

13. The method of claim 11 further comprising the step of: accessing a user interface using a display and an input device that is associated with a controller.

14. The method of claim 11 further comprising the step of: accessing a user interface using a remote computer through a distributed communications system.

15. The method of claim 11 further comprising the step of: designating at least one battery specifying parameter to be a manufacturer designation of said backup battery.

16. The method of claim 11 further comprising the step of: designating at least one battery specifying parameter to be a model designation of said backup battery.

17. The method of claim 11 wherein said parameters include at least one of a high voltage alarm, a low voltage alarm, a float voltage of said backup battery, a temperature-based parameter, and a backup battery discharge alarm.

18. The method of claim 11 further comprising the step of: receiving user-provided input of at least one of the following: a number of backup battery strings, a number of cells per string, and a capacity per string using a user interface.

* * * * *